US012730725B1

(12) United States Patent
Solanke et al.

(10) Patent No.: US 12,730,725 B1
(45) Date of Patent: Sep. 8, 2026

(54) AUTOMATED WORKLOAD SIZER FOR DATA PLATFORM SERVICE

(71) Applicant: Cohesity, Inc., San Jose, CA (US)

(72) Inventors: Amar Solanke, Pune (IN); Himanshu Srivastava, Bengaluru (IN); Rajat Partani, Bengaluru (IN); Suman Chandra Tokuri, Bengaluru (IN)

(73) Assignee: Cohesity, Inc., Santa Clara, CA (US)

( * ) Notice: Subject to any disclaimer, the term of this patent is extended or adjusted under 35 U.S.C. 154(b) by 0 days.

(21) Appl. No.: 18/780,179

(22) Filed: Jul. 22, 2024

(51) Int. Cl.
*G06F 16/00* (2019.01)
*G06F 11/1446* (2026.01)
*G06F 16/10* (2019.01)

(52) U.S. Cl.
CPC .......... *G06F 11/1458* (2013.01); *G06F 16/10* (2019.01); *G06F 2201/80* (2013.01)

(58) Field of Classification Search
CPC ... G06F 11/1458; G06F 2201/80; G06F 16/10
USPC .......................................................... 707/649
See application file for complete search history.

(56) References Cited

U.S. PATENT DOCUMENTS 12,181,999 B1 * 12/2024 Chen ......................... G06F 8/61
12,393,855 B1 * 8/2025 Jalali ................... H04L 41/0896
2020/0026580 A1 * 1/2020 Bahramshahry ...... G06F 9/5077
2021/0109802 A1 * 4/2021 Kesarwani .......... G06F 11/0709
2023/0205664 A1 * 6/2023 Higginson .......... G06F 11/3433 702/186
2024/0143414 A1 * 5/2024 Ramanujan .......... G06N 3/0455
2024/0427747 A1 * 12/2024 Agrawal ................ G06F 16/26

OTHER PUBLICATIONS

Wikipeda, "Autoregressive integrated moving average", Wikipeda: the Free Encyclopedia, Oct. 9, 2024, 9 pp., Retrieved from the Internet on Oct. 14, 2024 from URL: https://en.wikipedia.org/wiki/Autoregressive_integrated_moving_average.

* cited by examiner

*Primary Examiner* — Monica M Pyo
(74) *Attorney, Agent, or Firm* — Shumaker & Sieffert, P.A.

(57) ABSTRACT

In general, techniques are described for an automated workload sizer for data platform service. A computing device comprising a memory and processing circuitry may be configured to perform the techniques. The memory may store metadata indicative of data storage by a third-party service provider for a client of the data platform. The processing circuitry may execute an automated workload sizer. The automated workload sizer may process of the metadata indicative of the storage of the data by the third-party service provider to obtain an estimate of providing data platform services by the data platform for the data stored by the third-party service, and output of the estimate of providing the data platform services.

16 Claims, 5 Drawing Sheets

AUTOMATED WORKLOAD SIZER FOR DATA PLATFORM SERVICE

TECHNICAL FIELD

This disclosure relates to data platforms for computing systems.

BACKGROUND

Data platforms that support computing applications rely on primary storage systems to support latency sensitive applications. However, because primary storage is often more difficult or expensive to scale, a secondary storage system is often relied upon to support secondary use cases such as backup and archive.

A file system snapshot is a point-in-time copy or representation of the entire file system or a specific subset of it. A snapshot captures the state of files and directories at a particular moment, providing a snapshot of the file system's data as it existed at that specific point. File system snapshots are often used for backup and recovery purposes and can offer benefits in terms of data protection and system consistency. The file system data can include file system's objects (e.g., files, directories), metadata, or both.

The data platform may integrate with third-party services, such as document management services, text messaging services, data storage services, security services, etc. These third-party services may store data on behalf of the customer for the data platform that manages backup and archiving of the underlying data stored by the third party. When subscribing to the data platform services, a representative of the data platform may interface with the third-party services to better understand how much data is generated and/or stored by the third-party service, which often results in an estimate for data storage on which the customer data platform services (e.g., archive and/or backup) are based.

SUMMARY

Aspects of this disclosure describe techniques for an automated workload sizer for data platforms. Rather than require a representative of the data platform manually interfacing with third-party services that generate and store data for a potential customer of the data platform in order to provide the data platform estimate for data storage, the representative may execute the automated workload sizer. The automated workload sizer may interface with the third-party service (via an application programming interface (API) exposed by the third-party service) to obtain metadata describing data storage maintained by the third-party service. Such metadata may identify a license type (user-based or capacity-based) for the third-party service, a number of licenses or capacity provided by the third-party service, an amount of data (which may be defined in units of a particular type, e.g., number of documents, text messages, etc., along with a total amount of data stored, and an amount of time, such as days, weeks, months, etc. such data is stored by the third-party service), and the like.

The automated workload sizer may next execute a series of algorithms, which may include an artificial intelligence (AI) and/or machine learning (ML) model to predict a number of different services to be provided by the data platform along with costs, timing, and the like. For example, the automated workload sizer may determine a total time required for the first full backup (which may also be referred to as an onboarding time) and predict if a solution can meet the customer service level agreement—SLA (e.g., backups every 12 hours, 24 hours, 48 hours, etc.). The automated workload sizer may also facilitate planning of clusters (e.g., a size of the cluster) used to support the data platform services as well as planning of capacity for self-managed solutions (in which the data platform is hosted by the customer). In some instances, the automated workload sizer may identify ways by which to improve how fast the backup may occur and compute or predict additional costs associated with retrieving the data from the third-party service (e.g., for backup, snapshotting, and/or other data platform services).

The techniques of this disclosure may provide one or more technical advantages that realize one or more practical applications. The automated workload sizer may reduce the need for the representative of the data platform to have intricate knowledge of the third-party services, including how to access all of the metadata listed above via online portals, backend systems, and other interactions available to the data platform representative for interacting with the third-party service provider. Moreover, the automated workload sizer may more efficiently (in terms of computing resources consumed) interact with the third-party service provider via the exposed application programmer interfaces (APIs) to obtain the correct metadata regarding data storage/generation by the third-party service (as compared to a manual assessment). As such, the automated workload sizer may more precisely estimate the cost of the data platform services and avoid misquoting the customer of the data platform services, lost revenue from underestimating the cost of providing the data platform services to the customer, etc. while also improving the user experience and reducing an amount of computing resources (e.g., in terms of processing cycles, memory space, memory bus bandwidth, etc. along with power consumption) consumed due to the more efficient metadata retrieval.

In one example, various aspects of the techniques are directed to a method comprising: obtaining, by processing circuitry of a computing device, metadata indicative of data storage by a third-party service provider for a client of the data platform; executing, by the processing circuitry, an automated workload sizer, the automated workload sizer configured to perform: processing of the metadata indicative of the storage of the data by the third-party service provider to obtain an estimate of providing data platform services by the data platform for the data stored by the third-party service; and outputting of the estimate for providing the data platform services.

In another example, various aspects of the techniques are directed to a computing device comprising: a memory configured to store metadata indicative of data storage by a third-party service provider for a client of the data platform; processing circuitry configured to execute an automated workload sizer, the automated workload sizer configured to: process of the metadata indicative of the storage of the data by the third-party service provider to obtain an estimate of providing data platform services by the data platform for the data stored by the third-party service; and output of the estimate of providing the data platform services.

In another example, various aspects of the techniques are directed to a non-transitory computer-readable storage media having instructions stored thereon that, when executed, cause one or more processors to: obtain metadata indicative of data storage by a third-party service provider for a client of the data platform; execute an automated workload sizer, the automated workload sizer configured to: process the metadata indicative of the storage of the data by the third-party service provider to obtain an estimate of providing data platform services by the data platform for the data stored by the third-party service; and output the estimate of providing the data platform services.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference characters denote like elements throughout the text and figures.

DETAILED DESCRIPTION

Figure 1A:
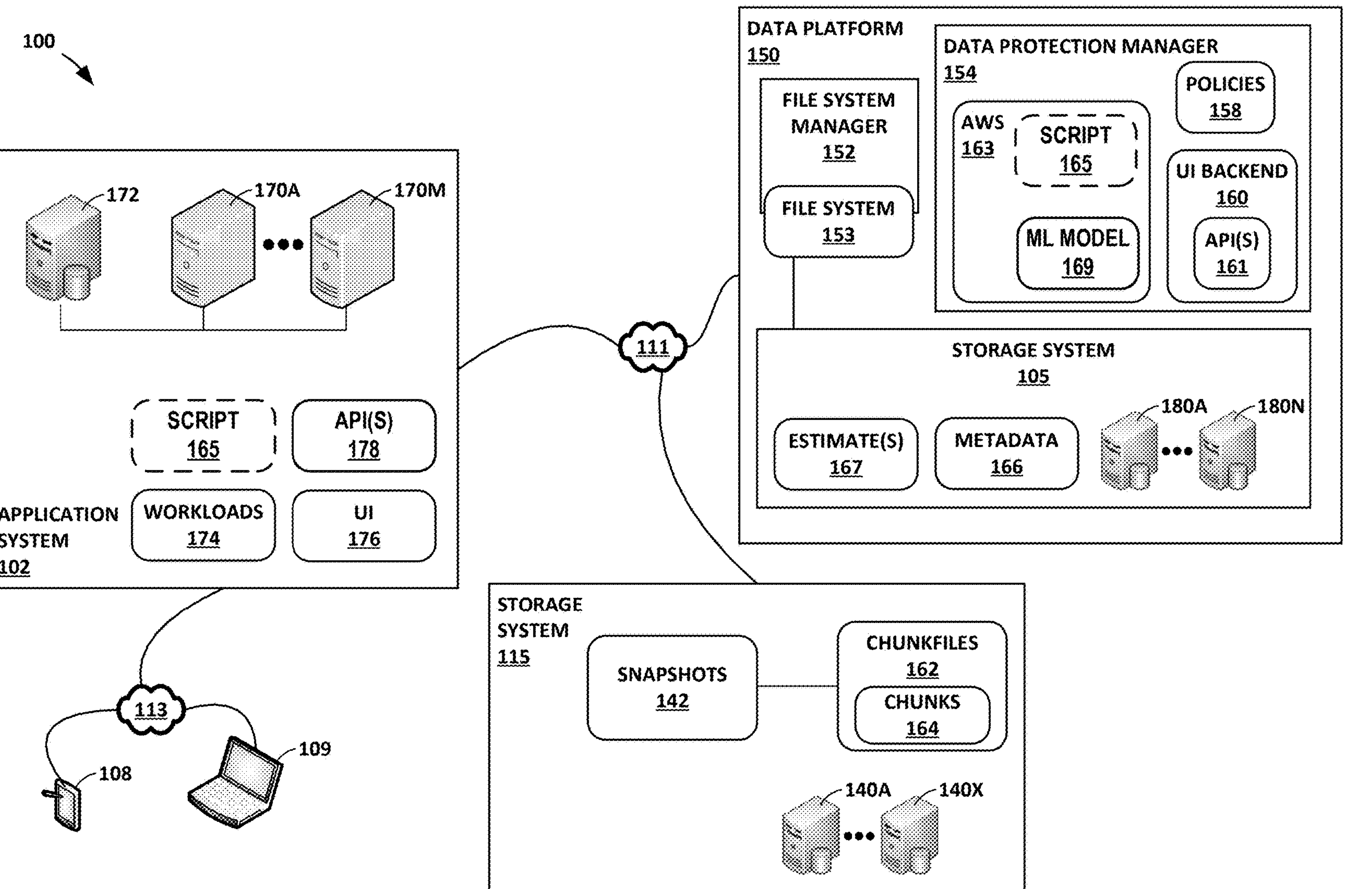
FIGS. 1A-1B are block diagrams illustrating example systems configured to support execution of an automated workload sizer, in accordance with various aspects of the techniques described in this disclosure.
Figure 1B:
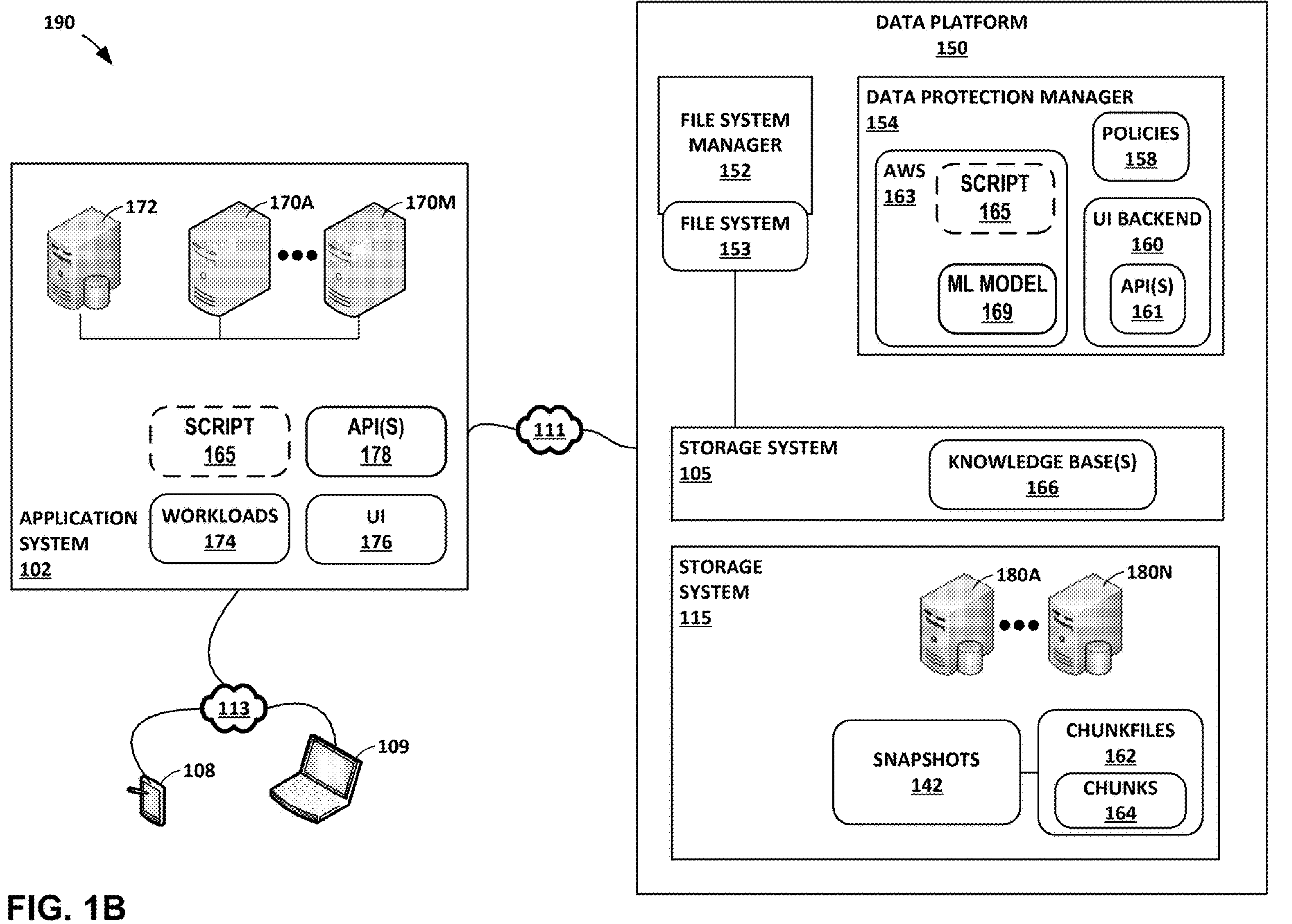

FIGS. 1A-1B are block diagrams illustrating example systems configured to support execution of an automated workload sizer, in accordance with various aspects of the techniques described in this disclosure. In the example of FIG. 1A, system 100 includes application system 102. Application system 102 represents a collection of hardware devices, software components, and/or data stores that can be used to implement one or more applications or services provided to one or more mobile devices 108 and one or more client devices 109 via a network 113. Application system 102 may include one or more physical or virtual computing devices that execute workloads 174 for the applications or services. Workloads 174 may include one or more virtual machines, containers, Kubernetes pods each including one or more containers, bare metal processes, and/or other types of workloads.

In the example of FIG. 1A, application system 102 includes application servers 170A-170M (collectively, "application servers 170") connected via a network with database server 172 implementing a database. Other examples of application system 102 may include one or more load balancers, web servers, network devices such as switches or gateways, or other devices for implementing and delivering one or more applications or services to mobile devices 108 and client devices 109. Application system 102 may include one or more file servers. The one or more file servers may implement a primary file system for application system 102. (In such instances, file system 153 may be a secondary file system that provides backup, archive, and/or other services for the primary file system. Reference herein to a file system may include a primary file system or secondary file system, e.g., a primary file system for application system 102 or file system 153 operating as either a primary file system or a secondary file system.)

Application system 102 may be located on premises and/or in one or more data centers, with each data center a part of a public, private, or hybrid cloud. The applications or services may be distributed applications. The applications or services may support enterprise software, financial software, office or other productivity software, data analysis software, customer relationship management, web services, educational software, database software, multimedia software, information technology, health care software, or other type of applications or services. The applications or services may be provided as a service (-aaS) for Software-aaS (SaaS), Platform-aaS (PaaS), Infrastructure-aaS (IaaS), Data Storage-aas (dSaaS), or other type of service.

In some examples, application system 102 may represent an enterprise system that includes one or more workstations in the form of desktop computers, laptop computers, mobile devices, enterprise servers, network devices, and other hardware to support enterprise applications. Enterprise applications may include enterprise software, financial software, office or other productivity software, data analysis software, customer relationship management, web services, educational software, database software, multimedia software, information technology, health care software, or other type of applications. Enterprise applications may be delivered as a service from external cloud service providers or other providers, executed natively on application system 102, or both. The external cloud service provider may represent a third-party service provider that is separate from clients operating mobile device 108 and/or computing device 109.

In the example of FIG. 1A, system 100 includes a data platform 150 that provides a file system 153 and backup or archival functions to an application system 102, using storage system 105 and separate storage system 115. Data platform 150 implements a distributed file system 153 and a storage architecture to facilitate access by application system 102 to file system data and to facilitate the transfer of data between storage system 105 and application system 102 via network 111. With the distributed file system, data platform 150 enables devices of application system 102 to access file system data, via network 111 using a communication protocol, as if such file system data was stored locally (e.g., to a hard disk of a device of application system 102). Example communication protocols for accessing files and objects include Server Message Block (SMB), Network File System (NFS), or AMAZON® Simple Storage Service (S3®). File system 153 may be a primary file system or secondary file system for application system 102.

File system manager 152 represents a collection of hardware devices and software components that implements file system 153 for data platform 150. Examples of file system functions provided by the file system manager 152 include storage space management including deduplication, file naming, directory management, metadata management, partitioning, and access control. File system manager 152 executes a communication protocol to facilitate access via network 111 by application system 102 to files and objects stored to storage system 105.

Data platform 150 includes storage system 105 having one or more storage devices 180A-180N (collectively, "storage devices 180"). Storage devices 180 may represent one or more physical or virtual compute and/or storage devices that include or otherwise have access to storage media. Such storage media may include one or more of Flash drives, solid state drives (SSDs), hard disk drives (HDDs), forms of electrically programmable memories (EPROM) or electrically erasable and programmable (EEPROM) memories, and/or other types of storage media used to support data platform 150. Different storage devices of storage devices 180 may have a different mix of types of storage media. Each of storage devices 180 may include system memory. Each of storage devices 180 may be a storage server, a network-attached storage (NAS) device, or may represent disk storage for a compute device. Storage system 105 may be a redundant array of independent disks (RAID) system.

In some examples, one or more of storage devices 180 are both compute and storage devices that execute software for data platform 150, such as file system manager 152 and data protection manager 154 in the example of system 100. In some examples, separate compute devices (not shown) execute software for data platform 150, such as file system manager 152 and data protection manager 154 in the example of system 100. Each of storage devices 180 may be considered and referred to as a "storage node" or simply as a "node". Storage devices 180 may represent virtual machines running on a supported hypervisor, a cloud virtual machine, a physical rack server, or a compute model installed in a converged platform.

In various examples, data platform 150 runs on physical systems, virtually, or natively in the cloud. For instance, data platform 150 may be deployed as a physical cluster, a virtual cluster, or a cloud-based cluster running in a private, hybrid private/public, or public cloud deployed by a cloud service provider. In some examples of system 100, multiple instances of data platform 150 may be deployed, and file system 153 may be replicated among the various instances. In some cases, data platform 150 is a compute cluster that represents a single management domain. The number of storage devices 180 may be scaled to meet performance needs.

Data platform 150 may implement and offer multiple storage domains to one or more tenants or to segregate workloads 174 that require different data policies. A storage domain is a data policy domain that determines policies for deduplication, compression, encryption, tiering, and other operations performed with respect to objects stored using the storage domain. In this way, data platform 150 may offer users the flexibility to choose global data policies or workload specific data policies. Data platform 150 may support partitioning.

A view is a protocol export that resides within a storage domain. A view inherits data policies from its storage domain, though additional data policies may be specified for the view. Views can be exported via SMB, NFS, S3, and/or another communication protocol. Policies that determine data processing and storage by data platform 150 may be assigned at the view level. A protection policy may specify a backup frequency and a retention policy, which may include a data lock period. Snapshots 142 or archives created in accordance with a protection policy inherit the data lock period and retention period specified by the protection policy.

Each of network 113 and network 111 may be the internet or may include or represent any public or private communications network or other network. For instance, network 113 may be a cellular, Wi-Fi®, ZigBee®, Bluetooth®, Near-Field Communication (NFC), satellite, enterprise, service provider, and/or other type of network enabling transfer of data between computing systems, servers, computing devices, and/or storage devices. One or more of such devices may transmit and receive data, commands, control signals, and/or other information across network 113 or network 111 using any suitable communication techniques. Each of network 111 or network 113 may include one or more network hubs, network switches, network routers, satellite dishes, or any other network equipment. Such network devices or components may be operatively inter-coupled, thereby providing for the exchange of information between computers, devices, or other components (e.g., between one or more client devices or systems and one or more computer/server/storage devices or systems). Each of the devices or systems illustrated in FIGS. 1A-1B may be operatively coupled to network 111 and/or network 113 using one or more network links. The links coupling such devices or systems to network 111 and/or network 113 may be Ethernet, Asynchronous Transfer Mode (ATM) or other types of network connections, and such connections may be wireless and/or wired connections. One or more of the devices or systems illustrated in FIGS. 1A-1B or otherwise on network 111 and/or network 113 may be in a local location and/or a remote location relative to one or more other illustrated devices or systems.

Application system 102, using file system 152 provided by data platform 150, generates objects and other data that file system manager 152 creates, manages, and causes to be stored to storage system 105. For this reason, application system 102 may alternatively be referred to as a "source system" (which may be provided by a third party and as such may represent a "third-party service provider") and file system 153 for application system 102 may alternatively be referred to as a "source file system." Application system 102 may for some purposes communicate directly with storage system 105 via network 111 to transfer objects, and for some purposes communicate with file system manager 152 via network 111 to obtain objects or metadata indirectly from storage system 105.

File system manager 152 generates and stores metadata to storage system 105. The collection of data stored to storage system 105 and used to implement file system 153 is referred to herein as file system data. File system data may include the aforementioned metadata and objects. Metadata may include file system objects, tables, trees, or other data structures; metadata generated to support deduplication; or metadata to support snapshots. As shown in the example of FIG. 1A for instance, storage system 105 may store metadata for file system 153 in a tree data structure. Objects that are stored may include files, virtual machines, databases, applications, pods, container, any of workloads 174, system images, directory information, or other types of objects used by application system 102. Objects of different types and objects of a same type may be deduplicated with respect to one another.

Data platform 150 includes data protection manager 154 that provides backups of file system data for file system 153. In the example of system 100, data protection manager 154 stores one or more backups, archives, and/or snapshots 142 of file system data, stored by storage system 105, to storage system 115 via network 111.

Storage system 115 includes one or more storage devices 140A-140X (collectively, "storage devices 140"). Storage devices 140 may represent one or more physical or virtual compute and/or storage devices that include or otherwise have access to storage media. Such storage media may include one or more of Flash drives, solid state drives (SSDs), hard disk drives (HDDs), optical discs, forms of electrically programmable memories (EPROM) or electrically erasable and programmable (EEPROM) memories, and/or other types of storage media. Different storage devices of storage devices 140 may have a different mix of types of storage media. Each of storage devices 140 may include system memory. Each of storage devices 140 may be a storage server, a network-attached storage (NAS) device, or may represent disk storage for a compute device. Storage system 115 may include redundant array of independent disks (RAID) system. Storage system 115 may be capable of storing much larger amounts of data than storage system 105. Storage devices 140 may further be configured for long-term storage of information more suitable for archival purposes.

In some examples, storage system 105 and/or 115 may be a storage system deployed and managed by a cloud storage provider and referred to as a "cloud storage system." Example cloud storage providers include, e.g., AMAZON WEB SERVICES (AWS™) by AMAZON, INC., AZURE® by MICROSOFT, INC., DROPBOX™ by DROPBOX, INC., ORACLE CLOUD™ by ORACLE, INC., and GOOGLE CLOUD PLATFORM (GCP) by GOOGLE, INC. In some examples, storage system 115 is co-located with storage system 105 in a data center, on-prem, or in a private, public, or hybrid private/public cloud. Storage system 115 may be considered a "backup" or "secondary" storage system for primary storage system 105. Storage system 115 may be referred to as an "external target" for snapshots 142. Where deployed and managed by a cloud storage provider, storage system 115 may be referred to as "cloud storage." Storage system 115 may include one or more interfaces for managing transfer of data between storage system 105 and storage system 115 and/or between application system 102 and storage system 115.

Data platform 150 that supports application system 102 relies on primary storage system 105 to support latency sensitive applications. However, because storage system 105 is often more difficult or expensive to scale, data platform 150 may use secondary storage system 115 to support secondary use cases such as backup, snapshot, archive, and/or other data platform services. In general, a file system backup or snapshot 142 is a copy of file system 153 to support protection of file system 153 for quick recovery, often due to some data loss in file system 153, and a file system archive ("archive") is a copy of file system 153 to support longer term retention and review. The "copy" of file system 153 may include such data as is needed to restore or view file system 153 in its state at the time of the backup or archive.

Data protection manager 154 may backup file system data for file system 153 at any time in accordance with backup policies 158 that specify, for example, backup periodicity and timing (daily, weekly, etc.), which file system data is to be backed up, a backup retention period, storage location, access control, and so forth. An initial backup of file system data corresponds to a state of the file system data at an initial backup time (the backup creation time of the initial backup). The initial backup may include a full backup of the file system data or may include less than a full backup of the file system data, in accordance with backup policies. For example, the initial backup may include all objects of file system 153 or one or more selected objects of file system 153.

One or more subsequent incremental backups of the file system 153 may correspond to respective states of the file system 153 at respective subsequent backup creation times, i.e., after the backup creation time corresponding to the initial backup. A subsequent backup may include an incremental backup of file system 153. A subsequent backup may correspond to an incremental backup of one or more objects of file system 153. Some of the file system data for file system 153 stored on storage system 105 at the initial backup creation time may also be stored on storage system 105 at the subsequent backup creation times. A subsequent incremental backup may include data that was not previously stored in a backup at storage system 115. File system data that is included in a subsequent backup may be deduplicated by data protection manager 154 against file system data that is included in one or more previous backups, including the initial backup, to reduce the amount of storage used. (Reference to a "time" in this disclosure may refer to dates and/or times. Times may be associated with dates. Multiple backups may occur at different times on the same date, for instance.)

In system 100, data protection manager 154 stores backups of file system data to storage system 115 as snapshots 142, using chunkfiles 162. Data protection manager 154 may use any of snapshots 142 to subsequently restore the file system (or portion thereof) to its state at the snapshot creation time, or the snapshot may be used to create or present a new file system (or "view") based on the snapshot, for instance. As noted above, data protection manager 154 may deduplicate file system data included in a subsequent snapshot against file system data that is included in one or more previous snapshots. For example, a second object of file system 153 included in a second snapshot may be deduplicated against a first object of file system 153 and included in a first, earlier snapshot. Data protection manager 154 may remove a data chunk ("chunk") of the second object and generate metadata with a reference (e.g., a pointer) to a stored chunk of chunks 164 in one of chunkfiles 162. The stored chunk in this example is an instance of a chunk stored for the first object.

Data protection manager 154 may apply deduplication as part of a write process of writing (i.e., storing) an object of file system 153 to one of snapshots 142 in storage system 115. Deduplication may be implemented in various ways. For example, the approach may be fixed length or variable length, the block size for the file system may be fixed or variable, and deduplication domains may be applied globally or by workload. Fixed length deduplication involves delimiting data streams at fixed intervals. Variable length deduplication involves delimiting data streams at variable intervals to improve the ability to match data, regardless of the file system block size approach being used. This algorithm is more complex than a fixed length deduplication algorithm but can be more effective for most situations and generally produces less metadata. Variable length deduplication may include variable length, sliding window deduplication. The length of any deduplication operation (whether fixed length or variable length) determines the size of the chunk being deduplicated.

In some examples, the chunk size can be within a fixed range for variable length deduplication. For instance, data protection manager 154 can compute chunks having chunk sizes within the range of 16-48 kB. Data protection manager 154 may eschew deduplication for objects that that are less than 16 kB. In some example implementations, when data of an object is being considered for deduplication, data protection manager 154 compares a chunk identifier (ID) (e.g., a hash value of the entire chunk) of the data to existing chunk IDs for already stored chunks. If a match is found, data protection manager 154 updates metadata for the object to point to the matching, already stored chunk. If no matching chunk is found, data protection manager 154 writes the data of the object to storage as one of chunks 164 for one of chunkfiles 162. Data protection manager 154 additionally stores the chunk ID in chunk metadata, in association with the new stored chunk, to allow for future deduplication against the new stored chunk. In general, chunk metadata is usable for generating, viewing, retrieving, or restoring objects stored as chunks 164 (and references thereto) within chunkfiles 162, for any of snapshots 142, and is described in further detail below.

Each of chunkfiles 162 includes multiple chunks 164. Chunkfiles 162 may be fixed size (e.g., 8 MB) or variable size. Chunkfiles 162 may be stored co-located with snapshot metadata, such as a tree data structure. In some cases, chunkfiles 162 may be stored using a data structure offered by a cloud storage provider for storage system 115. For example, each of chunkfiles 162 may be one of an S3 object within an AWS cloud bucket, an object within AZURE Blob Storage, an object in Object Storage for ORACLE CLOUD, or other similar data structure used within another cloud storage provider storage system.

The process of deduplication for multiple objects over multiple snapshots results in chunkfiles 162 that each have multiple chunks 164 for multiple different objects associated with the multiple snapshots. In some examples, different snapshots 142 may have objects that are effectively copies of the same data, e.g., for an object of the file system that has not been modified. An object of a snapshot may be represented or "stored" as metadata having references to chunks that enable the object to be accessed. Accordingly, description herein to a snapshot 142 "storing," "having," or "including" an object includes instances in which the snapshot does not store the data for the object in its native form.

As described above, chunkfiles 162 may represent an object in a snapshot storage system (shown as "storage system 115," which may also be referred to as "snapshot storage system 115") that conform to an underlying architecture of snapshot storage system 115. Data platform 150 includes data protection manager 154 that supports archiving of data in the form of chunkfiles 162, which interface with snapshot storage system 115 to store chunkfiles 162 after forming chunkfiles 162 from one or more chunks 164 of data. Data protection manager 154 may apply a process referred to as "deduplication" with respect to chunks 164 to remove redundant chunks and generate metadata linking redundant chunks to previously stored chunks 164 and thereby reduce storage consumed (and thereby reduce storage costs in terms of storage required to store the chunks).

Data platform 150 may integrate with third-party services, such as document management services, text messaging services, data storage services, security services, etc. An example of these third-party services may include Microsoft 365™ (also known as M365), Gsuite™ by Google LLC, Amazon Web Services (AWS) from Amazon, Inc., etc. These third-party services may store data on behalf of the customer for data platform 150 that manages backup and archiving of the underlying data stored by the third party service. When subscribing to the data platform services, a representative of data platform 150 may interface with the third-party services to better understand how much data is generated and/or stored by the third-party service, which often results in an estimate (including a cost) for data storage on which the customer data platform services (e.g., archive and/or backup) are based.

In accordance with various aspects of the techniques described in this disclosure, data protection manager 154 may include an automated workload sizer (AWS) 163. Rather than require a representative of data platform 150 to manually interface with third-party services (that support execution of application system 102) that generate and store data for a potential customer of data platform 150 in order to provide an estimate for data storage provided by data platform 150, the representative may execute AWS 163. AWS 163 may interface with the third-party service (via an application programming interface—shown as API(s) 182—exposed by the third-party service) to obtain metadata describing data storage maintained by the third-party service. Such metadata may identify a license type (user-based or capacity-based) for the third-party service, a number of licenses or capacity provided by the third-party service, an amount of data (which may be defined in units of a particular type, e.g., number of documents, text messages, etc., along with a total amount of data stored, and an amount of time, such as days, weeks, months, etc. such data is stored by the third-party service), and the like.

AWS 163 may next execute a series of one or more algorithms, which may involve an artificial intelligence and/or machine learning model, to predict a number of different services to be provided by data platform 150 along with costs, timing, and the like. For example, AWS 163 may determine a total time required for the first full backup (which may also be referred to as an onboarding time) and predict if a solution can meet the customer service level agreement—SLA (e.g., backups every 12 hours, 24 hours, 48 hours, etc.). AWS 163 may also facilitate planning of clusters (e.g., a size of the cluster) used to support the data platform services as well as planning of capacity for self-managed solution (in which data platform 150 is hosted by the customer). In some instances, AWS 163 may identify ways by which to improve how fast the backup may occur and compute or predict additional costs associated with retrieving the data from the third-party service.

In operation, data protection manager 154 may execute AWS 163, which may obtain metadata 166 indicative of data stored by a third-party service provider for a (potential or existing) client of data platform 150. AWS 163 may include a script 165 that may be executed locally by data protection manager 154 or remotely by the third-party service (or computing devices of the client), where the dashed-line box shown as "script 165" reflects that the script 165 may be executed locally by data protection manager 154 or remotely by the third-party service and/or client computing devices (including computing device 109 and/or mobile device 108).

Script 165 may include a series of API calls that invoke various functions of API(s) 178 for retrieving metadata 166 from the third-party service provider. API(s) 178 for the third-party service may allow the client to manage the third-party services and retrieve metadata 166. Script 165 may require the client to enter authentication information (e.g., username and password, multi-factor authentication—MFA—information, security keys, etc.) in order to access the client account used for authenticating the client with respect to the third-party service provider. In this instance, the client may direct local hardware (including computing device 109 and/or mobile device 108) to download script 165 to preserve the security of accessing the third-party services and avoid having to provide any security authorization (including the authentication information) to data platform 150.

After collecting metadata 166, script 165 may provide metadata 166 to AWS 163, which may store the metadata to storage system 105. Metadata 166 may include a wide range of data, including one or more of the following:

- a number of objects stored for each account supported by the third-party service provider for the client of data platform 150;
- an amount of storage available for each of the accounts supported by the third-party service provider for the client of data platform 150;

- a frequency with which the objects are stored for each of the accounts supported by the third-party service provider for the client of data platform 150;
- a number of sites provided by the third-party service provider that store the data on behalf of the client of data platform 150;
- a location of the sites provided by the third-party service provider;
- a cost of providing the data storage of the objects by the third-party service provider for the client of the data platform;
- a number of active accounts; and
- a number of active workloads per each of the active accounts.

AWS 163 may next be configured to process metadata 166 indicative of the storage of the data by the third-party service provider to obtain an estimate 167 of providing data platform services by data platform 150 for the data stored by the third-party service. AWS 163 may include a machine learning (ML) model 169 configured to process metadata 166 or statistically extrapolated versions of metadata 166 to obtain estimate 167.

ML model 169 may represent one or more statistical models, one or more artificial intelligence (AI) models, and/or one or more ML models trained on training data and/or the client data (e.g., the data stored by the third-party service provider on behalf of the client and/or metadata 166). There are a number of different statistical models, including a seasonal autoregressive integrated moving average (SARIMA) model, an autoregressive moving average (ARMA) model, a moving average (MA) model or any other time series model. For purposes of example, it is assumed that ML model 169 includes a SARIMA model.

Artificial intelligence (AI) generally refers to a way by which autonomous devices operate to identify decisions responsive to changing observed state. AI models may utilize machine learning (ML), which typically involves training a machine learning model with training data to produce a trained model able to generalize properties of data based on similar patterns with the training data. Training the model may involve learning model parameters by optimizing an objective function, thus optimizing a likelihood of observing the training data given the model.

ML models 169 may include any number of different types of machine learning models, such as neural networks, deep neural networks, dense neural networks, and the like. Although described with respect to machine learning models, the techniques described in this disclosure are also applicable to other types of AI models, including rule-based models, finite state machines, and the like.

Machine learning may generally enable a computing device to analyze input data and identify an action to be performed responsive to the input data. Each machine learning model may be trained using training data that reflects likely input data. The training data may be labeled or unlabeled (meaning that the correct action to be taken based on a sample of training data is explicitly stated or not explicitly stated, respectively).

The training of the machine learning model may be guided (in that a designer, such as a computer programmer, may direct the training to guide the machine learning model to identify the correct action in view of the input data) or unguided (in that the machine learning model is not guided by a designer to identify the correct action in view of the input data). In some instances, the machine learning model is trained through a combination of labeled and unlabeled training data, a combination of guided and unguided training, or possibly combinations thereof. Examples of machine learning include nearest neighbor, naïve Bayes, decision trees, linear regression, support vector machines, neural networks, k-Means clustering, Q-learning, temporal difference, deep adversarial networks, evolutionary algorithms or other supervised, unsupervised, semi-supervised, or reinforcement learning algorithms to train one or more models.

Even when the machine learning model undergoes guided training with labeled training data (which may represent what might be considered the most directed training that should result in more expected actions compared to unguided training using unlabeled training data or various combinations thereof), there are limits to training the machine learning model as such training is not often exhaustive (in terms of fully sampling each feature of the space defined by the input data). In other words, there is limited training data that may not or may not fully address the wider variability of the input data. Further, a potential benefit of machine learning models is to avoid exhaustive and time-consuming comprehensive training but still produce a machine learning model that performs accurate action (which is another way of referring to a "decision") identification through limited sampled training.

As noted above, AI models include neural networks, such as feedforward neural networks, recurrent neural networks (e.g., long short term memory—LSTM), convolutional neural networks, etc. For purposes of example, it is assumed that ML model 169 includes an LSTM. ML model 169 may first apply the SARIMA model to the metadata 166 to extrapolate metadata 166 and then invoke the LSTM to process extrapolated metadata 166' (where the prime notation denotes modification of metadata 166) and produce estimate 167. The LSTM may undergo active training over time and may be invoked periodically to provide additional estimates 167 that continue to improve over time. In any event, the LSTM may output estimates 167 for review by sales representative of data platform services and/or the prospective client of the data platform services.

The techniques of this disclosure may provide one or more technical advantages that realize one or more practical applications. AWS 163 may reduce the need for the representative of data platform 150 to have intricate knowledge of the third-party services, including how to access all of the metadata listed above via online portals, backend systems, and other interactions available to the data platform representative for interacting with the third-party service provider. Moreover, AWS 163 may more efficiently (in terms of computing resources consumed) interact with the third-party service provider via the exposed application programmer interfaces (APIs) 178 to obtain the correct metadata regarding data storage/generation by the third-party service (as compared to a manual assessment). As such, AWS 163 may more precisely estimate the cost of the data platform services and avoid misquoting the customer (which is another way to refer to the client) of the data platform services, avoid lost revenue from underestimating the cost of providing the data platform services to the customer, etc. while also improving the user experience and reducing an amount of computing resources (e.g., in terms of processing cycles, memory space, memory bus bandwidth, etc. along with power consumption) consumed due to the more efficient metadata retrieval.

System 190 of FIG. 1B is a variation of system 100 of FIG. 1A in that data platform 150 stores snapshots 142 using chunkfiles 162 stored to snapshot storage system 115 that resides on premises or, in other words, local to data platform 150. In some examples of system 190, storage system 115 enables users or applications to create, modify, or delete chunkfiles 162 via file system manager 152. In system 190, storage system 105 of FIG. 1B is the local storage system used by data protection manager 154 for initially storing and accumulating chunks prior to storage at storage system 115.

Figure 2:
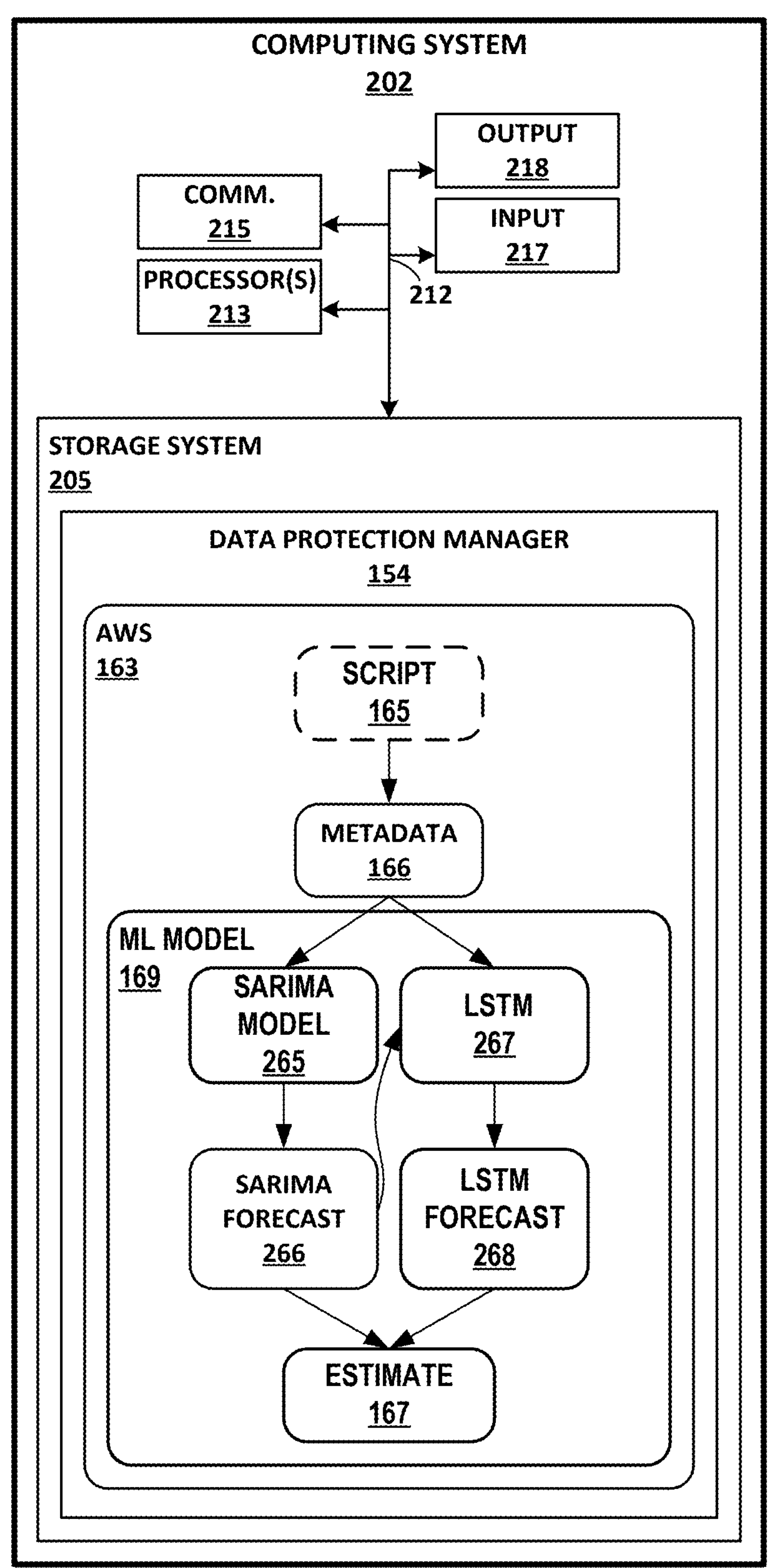
FIG. 2 is a block diagram illustrating an example of a computing system configured to execute the automated workload sizer, in accordance with techniques of this disclosure.

FIG. 2 is a block diagram illustrating an example of a computing system configured to execute the automated workload sizer, in accordance with techniques of this disclosure. Computing system 202 of FIG. 2 may represent an example of a computing device that supports execution of data platform 150 and may be described in the context of system 100 of FIG. 1A or system 190 of FIG. 1B.

While described with respect to a computing device that supports execution of data platform 150, computing device 202 may represent a computing device of the client requesting data platform 150 provide data platform services with respect to data stored by the third-party service provider. In the context of a computing device of the client, computing device 202 may download AWS 163 and execute AWS 163 to generate estimate 167 including reports described in more detail below with respect to a computing device that supports data platform 150.

In the example of FIG. 2, computing system 202 may be implemented as any suitable computing system, such as one or more server computers, workstations, mainframes, appliances, cloud computing systems, and/or other computing systems that may be capable of performing operations and/or functions described in accordance with one or more aspects of the present disclosure. In some examples, computing system 202 represents a cloud computing system, server farm, and/or server cluster (or portion thereof) that provides services to other devices or systems. In other examples, computing system 202 may represent or be implemented through one or more virtualized compute instances (e.g., virtual machines, containers) of a cloud computing system, server farm, data center, and/or server cluster.

In the example of FIG. 2, computing system 202 may include one or more communication units 215, one or more input devices 217, one or more output devices 218, and one or more storage devices of local storage system 205 ("storage system 205"). One or more of the devices, modules, storage areas, or other components of computing system 202 may be interconnected to enable inter-component communications (physically, communicatively, and/or operatively). In some examples, such connectivity may be provided through communication channels (e.g., communication channels 212), which may represent one or more of a system bus, a network connection, an inter-process communication data structure, or any other method for communicating data.

One or more processors 213 of computing system 202 may implement functionality and/or execute instructions associated with computing system 202 or associated with one or more modules illustrated in FIG. 2 and described below. One or more processors 213 may be, may be part of, and/or may include processing circuitry that performs operations in accordance with one or more aspects of the present disclosure. Examples of processors 213 include microprocessors, application processors, display controllers, auxiliary processors, one or more sensor hubs, and any other hardware configured to function as a processor, a processing unit, or a processing device. Computing system 202 may use one or more processors 213 to perform operations in accordance with one or more aspects of the present disclosure using software, hardware, firmware, or a mixture of hardware, software, and firmware residing in and/or executing at computing system 202.

One or more communication units 215 of computing system 202 may communicate with devices external to computing system 202 by transmitting and/or receiving data, and may operate, in some respects, as both an input device and an output device. In some examples, communication units 215 may communicate with other devices over a network. In other examples, communication units 215 may send and/or receive radio signals on a radio network such as a cellular radio network. In other examples, communication units 215 of computing system 202 may transmit and/or receive satellite signals on a satellite network. Examples of communication units 215 include a network interface card (e.g., such as an Ethernet card), an optical transceiver, a radio frequency transceiver, a GPS receiver, or any other type of device that can send and/or receive information. Other examples of communication units 215 may include devices capable of communicating over Bluetooth®, GPS, NFC, ZigBee®, and cellular networks (e.g., 3G, 4G, 5G), and Wi-Fi® radios found in mobile devices as well as Universal Serial Bus (USB) controllers and the like. Such communications may adhere to, implement, or abide by appropriate protocols, including Transmission Control Protocol/Internet Protocol (TCP/IP), Ethernet, Bluetooth®, NFC, or other technologies or protocols.

One or more input devices 217 may represent any input device of computing system 202 not otherwise separately described herein. Input devices 217 may generate, receive, and/or process input. For example, one or more input devices 217 may generate or receive input from a network, a user input device, or any other type of device for detecting input from a human or machine.

One or more output devices 218 may represent any output devices of computing system 202 not otherwise separately described herein. Output devices 218 may generate, present, and/or process output. For example, one or more output devices 218 may generate, present, and/or process output in any form. Output devices 218 may include one or more USB interfaces, video and/or audio output interfaces, or any other type of device capable of generating tactile, audio, visual, video, electrical, or other output. Some devices may serve as both input and output devices. For example, a communication device may both send and receive data to and from other systems or devices over a network.

One or more storage devices of local storage system 205 within computing system 202 may store information for processing during operation of computing system 202, such as random access memory (RAM), Flash memory, solid-state disks (SSDs), hard disk drives (HDDs), etc. Storage devices may store program instructions and/or data associated with one or more of the modules described in accordance with one or more aspects of this disclosure. One or more processors 213 and one or more storage devices may provide an operating environment or platform for such modules, which may be implemented as software, but may in some examples include any combination of hardware, firmware, and software. One or more processors 213 may execute instructions and one or more storage devices of storage system 205 may store instructions and/or data of one or more modules. The combination of processors 213 and local storage system 205 may retrieve, store, and/or execute the instructions and/or data of one or more applications, modules, or software. Processors 213 and/or storage devices of local storage system 205 may also be operably coupled to one or more other software and/or hardware components, including, but not limited to, one or more of the components of computing system 202 and/or one or more devices or systems illustrated as being connected to computing system 202.

In the example of M365 and similar workloads, there have been challenges in onboarding the customer.

These challenges may exist at the following various levels:

1. Choosing license type (User-based or Capacity-based)
2. What is the capacity or number of licenses to be sold?
3. Total time required for the first full backups (onboarding time)?
4. Predict if a solution can meet customers' SLAs (Backups every 12 hours, 24 hours, 48 hours, or more).
5. How do we plan the size clusters (e.g., compute, storage, etc.) in data platform software as a service (SaaS) solution?
6. How do we plan capacity for self-managed solutions?
7. Are there any additional deployment levers for faster backup?
8. Additional charges for paid API services from Microsoft?

As noted above, data protection manager 154 may execute AWS 163 to potentially more efficiently address these challenges, which may begin by obtaining metadata 166 indicative of data stored by a third-party service provider for a (potential or existing) client (which again is another way to refer to a customer) of data platform 150. AWS 163 may include a script 165 that may be executed locally by data protection manager 154 or remotely by the third-party service (or computing devices of the client), where the dashed-line box shown as "script 165" reflects that the script 165 may be executed locally by data protection manager 154 or remotely by the third-party service and/or client computing devices (including computing device 109 and/or mobile device 108).

Script 165 may include a series of API calls that invoke various functions of API(s) 178 for retrieving metadata 166 from the third-party service provider. API(s) 178 for the third-party service may allow the client to manage the third-party services and retrieve metadata 166. Script 165 may require the client to enter authentication information (e.g., username and password, multi-factor authentication—MFA—information, security keys, etc.) in order to access the client account used for authenticating the client with respect to the third-party service provider. In this instance, the client may direct local hardware (including computing device 109 and/or mobile device 108) to download script 165 to preserve the security of accessing the third-party services and avoid having to provide any security authorization (including the authentication information) to data platform 150.

An example is described below with respect to M365 and operation of AWS 163. While described with respect to M365, various aspects of the techniques may apply to any third-party service provider in which data storage/generation needs to be accurately estimated to better set data platform service costs and customer expectations.

Data Collection from the M365 Source

- The modules Microsoft.Graph.Reports, Microsoft.Graph.Groups and ExchangeOnlineManagement may be downloaded in the user setup if not available already.
- Connection to the M365 source is done with permissions—"Reports.Read.All", "User.Read.All", "Group.Read.All" and/or "Sites.Read.All". All permissions are for reading data only. No data will be modified in the source.
- Data for each M365 workload is collected in a step-by-step process.
- For OneDrive, script 165 may use APIs getOneDriveUsageAccountDetail and getOneDriveUsageStorage. These APIs represent an example of APIs 178 and return data about how many OneDrives are available in the source. For each OneDrive script 165 may obtain how many files it currently has, and how much storage is available and used. Script 165 may also get the owner's name and associated site url if any. For the source, script 165 may also get how much storage is getting used on a particular day or certain period viz. 7, 30, 90, and 180 days. Microsoft may allow data retrieval for a maximum of 180 days but this data can be extrapolated to predict usage for the next 6 months or even a year.

- For SharePoint, script 165 may invoke APIs getSharePointSiteUsageDetail and getSharePointSiteUsageStorage. Similar to OneDrive, script 165 may get details about all sites, storage used, file counts etc. Script 165 may also get the number of pages viewed across all sites. Using such information, AWS 163 may be able to predict the usage trends of SharePoint sites.
- For mailbox, script 165 may invoke APIs getMailboxUsageDetail and getMailboxUsageStorage to get storage details, item count, activity details, etc. Script 165 may also retrieve data about Exchange Online—how many instances are there for each type of mailbox such as shared mailbox, room mailbox, user mailbox, etc. AWS 163 may suggest different types of licensing according to the mailbox types the user wants to back up.
- For groups, script 165 may invoke the Get-MgGroup API to retrieve all the groups. This Get-MgGroup API returns all the groups belonging to the M365 source. Script 165 may retrieve information, such as the visibility of a group, is the group deleted or not, the group expiry time, etc. Using this information, AWS 163 may can tweak the backup strategy. AWS 163 may determine intelligent decisions, such as taking backup of the groups about to be deleted permanently. Since Group backup takes time, the backup algorithm can help us set a priority order of taking backups ensuring minimal data loss.
- Teams have additional application integrations and membership is maintained in Groups. With multiple application integrations, data in Teams could be of different types and AWS 163 may have supported this under one single backup. Script 165 may collect data from APIs such as getTeamsTeamActivityDetail and getTeamsUserActivityUserDetail for full backup coverage and optimized performance.—Apart from these workloads, script 165 may also collect Azure AD level reports to get metrics, such as how many users are active and which user has which workloads enabled. AWS 163 may also retrieve multi-geographical data to determine the locations to store data backups.

After collecting metadata 166 (which refers to all the different types of data listed above), script 165 may provide metadata 166 to AWS 163, which may store the metadata to storage system 105 (see, e.g., FIG. 1A). Metadata 166 may include a wide range of data, including one or more of the following:

- a number of objects stored for each account supported by the third-party service provider for the client of data platform 150;
- an amount of storage available for each of the accounts supported by the third-party service provider for the client of data platform 150;

- a frequency with which the objects are stored for each of the accounts supported by the third-party service provider for the client of data platform 150;
- a number of sites provided by the third-party service provider that store the data on behalf of the client of data platform 150;
- a location of the sites provided by the third-party service provider;
- a cost of providing the data storage of the objects by the third-party service provider for the client of the data platform;
- a number of active accounts; and
- a number of active workloads per each of the active accounts.

AWS 163 may next be configured to process metadata 166 indicative of the storage of the data by the third-party service provider to obtain an estimate 167 of providing data platform services by data platform 150 for the data stored by the third-party service. AWS 163 may include a machine learning (ML) model 169 configured to process metadata 166 or statistically extrapolated versions of metadata 166 to obtain estimate 167. Estimate 167 may include reports generated through application of ML model 169.

ML model 169 may represent one or more statistical models, one or more artificial intelligence (AI) models, and/or one or more ML models trained on training data and/or the client data (e.g., the data stored by the third-party service provider on behalf of the client and/or metadata 166). There are a number of different statistical models, including a seasonal autoregressive integrated moving average (SARIMA) model, an autoregressive moving average (ARMA) model, a moving average (MA) model or any other time series model. For purposes of example, it is assumed that ML model 169 includes a SARIMA model 265.

As noted above, AI models include neural networks, such as feedforward neural networks, recurrent neural networks (e.g., long short term memory—LSTM), convolutional neural networks, etc. For purposes of example, it is assumed that ML model 169 includes an LSTM 267. ML model 169 may first apply the SARIMA model to the metadata 166 to extrapolate metadata 166 and then invoke the LSTM to process extrapolated metadata 166' (where the prime notation denotes modification of metadata 166) and produce estimate 167. LSTM 267 may undergo active training over time and may be invoked periodically to provide additional estimates 167 that continue to improve over time. In any event, the LSTM may output estimates 167 for review by sales representative of data platform services and/or the prospective client of the data platform services.

Referring back to the example of M365, ML model 169 may first analyze the correct licensing model. With the collected data, ML model 169 may calculate the total number of objects to be backed up, the average storage consumption per object, the average storage consumption per user, and daily growth. Based on calculated parameters, ML model 169 may recommend consumption storage vs user based licensing, where:

Consumption-based licensing—

If the average storage consumption per object is less than 10 GB or more than 50 GB, and the total number of objects is less than 5000, then the recommended model is consumption-based licensing.

User-based licensing—

If the average storage consumption per object is more than 10 GB and less than 50 GB, then the recommended model is user-based licensing.

If the total number of objects is more than 5K+, then the recommended model is user-based licensing.

Analyze the Time Required for the First Backup

With the computed number of API calls required and the daily API limits imposed by Microsoft based on the license, ML model 169 may compute the minimum and maximum days required to onboard and recommend the average of these two values.

Product Deployment Strategy

Capacity Planning a) Cluster sizing/shared cluster

This is valid in the case of a dedicated cluster. Based on storage consumption, ML model 169 can predict the number of nodes required. Based on the storage required(collected from reports), ML model 169 may suggest if a shared or dedicated cluster will be required. (For example, if total storage is more than 60 TB, ML model 169 may recommend a dedicated cluster).

b) Regions

Based on regions used in the customer's M365 account, ML model 165 may determine one or more regions required for the tenant. ML model 165 may also determine the capacity of nodes and shared clusters for potentially optimized cost.

c) Node sizing

Within deployed clusters, based on collected M365 stats, ML model 169 may determine a size for nodes as required for possibly the best performance and optimal cost.

Deployment Guidelines for Optimized Performance

A. Number of Azure AD apps a. Right now, ML model 169 may use the number of objects to guide the number of apps required. For example, up to 5000→1 app, up to 20000→2 apps, up to 50000→3 apps, 50000 and above 4 apps. ML model 169 may cap on 4 apps since there have been better results in onboarding with not more than 4 apps as when there are more than 4 apps (e.g., due to third party throttling).

B. Distribution across regions a. ML model 169 may use APIs to get the multi-geo regions which may be used to determine which regions customers should register their source and backup. The backup time also fluctuates according to the location of where the data is residing and where it should be stored.

b. If required, ML model 169 may split M365 apps backup across regions for potentially better performance.

C. Schedule optimization a. Based on the customer's time zone and the cluster on which the customer is onboarded, ML model 169 may recommend an ideal window when the backups should be scheduled for possibly optimal performance.

Data Growth Prediction Mechanism:

ML model 169 may combine statistical and ML-based methods to predict the future trends of a particular customer more accurately. ML model 169 may combine organization-specific data and the region, organization domain, etc. (to which the organization belongs) as inputs to SARIMA model 265 and LSTM 267.

Organization Data:

1. Organization domain
2. Organization subdomain
3. Geographical Region
4. Backup schedule & Retention requirements Sizer's Data:

1. Number of objects (w/ app type)
2. Total data (w/ app type)
3. MoM growth (w/ app type)

Requirement Data:

1. Period for which growth may need to be predicted.

SARIMA model 265 may extend a powerful time series forecasting model ARIMA (Autoregressive Integrated Moving Average) which is used for analyzing and predicting sequential data with a stationary trend by taking into account the seasonal variations in data also. The accuracy of SARIMA forecasts generally deteriorates as the forecast horizon increases thus they are better suited for short to medium-term forecasting tasks only. Also since SARIMA is a statistical technique, SARIMA model 265 does not have a feedback loop to improve forecasting.

Due to these shortcomings, ML model 169 includes the ML technique LSTM(Long Short-Term Memory; shown as LSTM 267 in the example of FIG. 2) in addition to SARIMA model 265. LSTM 267 refers to a recurrent neural network (RNN) architecture designed to address the issue of capturing long-term dependencies in data. LSTM 267 being a neural network may take a lot of data and time before starting to predict accurately.

To solve these problems, ML model 169 may include SARIMA model 265 to perform the initial feature engineering for LSTM model 267. SARIMA model 265 may also be used on validation and test data essentially working as a feedback mechanism for LSTM model 267. For the final results, ML model 169 may combine the outputs from both LSTM 267 and SARIMA model 265. This hybrid modeling approach may ensure that the predictions within a short period will be more accurate after the model deployment. LSTM 267 may be continuously trained and over time the accuracy of LSTM 267 may continue to improve. LSTM 267 can also potentially catch any new trend in data and fine-tune itself. Initially the final output will be a weighted average of the outputs generated by LSTM 267 and SARIMA model 265. Over time the weight of SARIMA model 265 will be decreased as the accuracy of the LSTM model increases.

In this respect, ML model 169 comprises a seasonal autoregressive integrated moving averaging model 267 that extrapolates the metadata to forecast estimated data storage required by the client for the third-party service (where the forecast is shown as "sarima forecast 266"), and a long-short term memory model 267 that generates, based on the estimated data storage, the LSTM forecast 268 of providing the data platform services. As noted above, ML model 169 may combine SARIMA forecast 266 and LSTM forecast 268 using various combination techniques such as a weighted average of SARIMA forecast 266 and LSTM forecast 268.

In other words, estimate 167 may include one or more of:

a cluster sizing for providing the data platform services that estimates a number of nodes used by the data platform to support the data platform services for the data stored by the third-party service;

one or more regions of the data platform services that will be utilized for the data platform;

an approximate cost of providing the data platform services; and a schedule for performing the data platform services.

Alerting Mechanism

For a given cluster, AWS 163 may query our above growth prediction model for all the tenants in that cluster, to get an estimate of object and data growth in the given period and then the mechanism (based on solution suggested below) will generate proactive alerts to move tenant(s) from one cluster to another(shared/dedicated). AWS 163 may have workflow automation built on top of this alert to automatically do tenant migration as per the recommendation. This can also be queried for a given customer at the time of onboarding to suggest a cluster(shared/dedicated) for placement. The above alerting mechanism may, as one example, execute every 15 days on all clusters. In this respect, AWS 163 may be configured to determine whether an alert indicating when to move the client between different clusters of the data platform is to be generated.

Problem Formulation and Possible Solution

There is a set of clusters and a set of tenants. Each cluster has a fixed amount of resources. Each tenant requires a fixed amount of resources and has a cost associated with being placed in a particular cluster. There may be a need to efficiently find a cluster for each tenant. This is an NP-hard problem and thus use of the approximation technique like Mixed Integer Programming (MIP), may solve it.

A Generic Approach for Other Workloads

The Above sizer model can easily be replicated to below workloads

Azure workloads—where AWS 163 may fire Azure APIs to get stats for disks storage, Blob storage, # of VMs. With this data AWS 163 may suggest all the above things like dedicated vs shared cluster, number of nodes, onboarding timeline, license, etc.

AWS workloads—AWS 163 may fire AWS APIs to get stats for disks storage, S3 buckets, # of EC2 instances. With this data AWS 163 may suggest all the above things like dedicated vs shared cluster, number of nodes, onboarding timeline, license, etc.

Google cloud workloads—AWS 163 may fire GCP APIs to get stats for disks storage, Google cloud storage, # of Virtual Machines. With this data AWS 163 may suggest all the above things like dedicated vs shared cluster, number of nodes, onboarding timeline, license, etc.

Other SaaS Apps like Google Workspace, Salesforce, Slack, Workday, etc. Very similar to M365 the data collection pieces can be written for Google Workspace, Salesforce, Slack, Workday. Analysis, Deployment strategy and capacity planning can be reused for these workloads with very small changes.

Other cloud workloads like VMC: Sizer can be very extended for cloud workloads like VMC and similar workloads.

Figure 3:
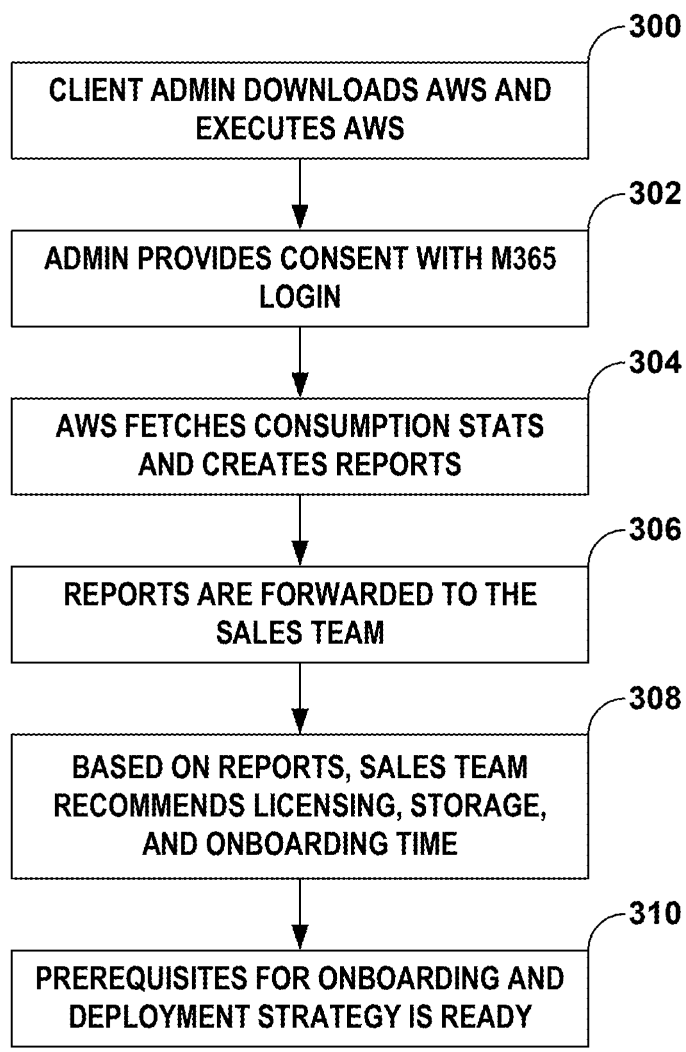
FIG. 3 is a flowchart illustrating one example of an overall process in which the automated work sizer is employed according to various aspects of the techniques described in this disclosure.

FIG. 3 is a flowchart illustrating one example of an overall process in which the automated work sizer is employed according to various aspects of the techniques described in this disclosure. Initially, a sales team for data platform 150 may instruct the client admin to download AWS 163, where the client admin then proceeds to download AWS 163 (e.g., script 165) (300). Admin next provides consent with M365 or other workloads login (which is another way to refer to authentication credentials, such as a username and password) (302).

AWS 163 may next fetch consumption stats and creates reports (304), where the reports are then forwarded to the sales team in the form of estimate 167 (306). Based on the reports, the sales team may recommend licensing, storage and onboarding time (308). At this point, prerequisites for onboarding and deployment strategy is ready (310).

Figure 4:
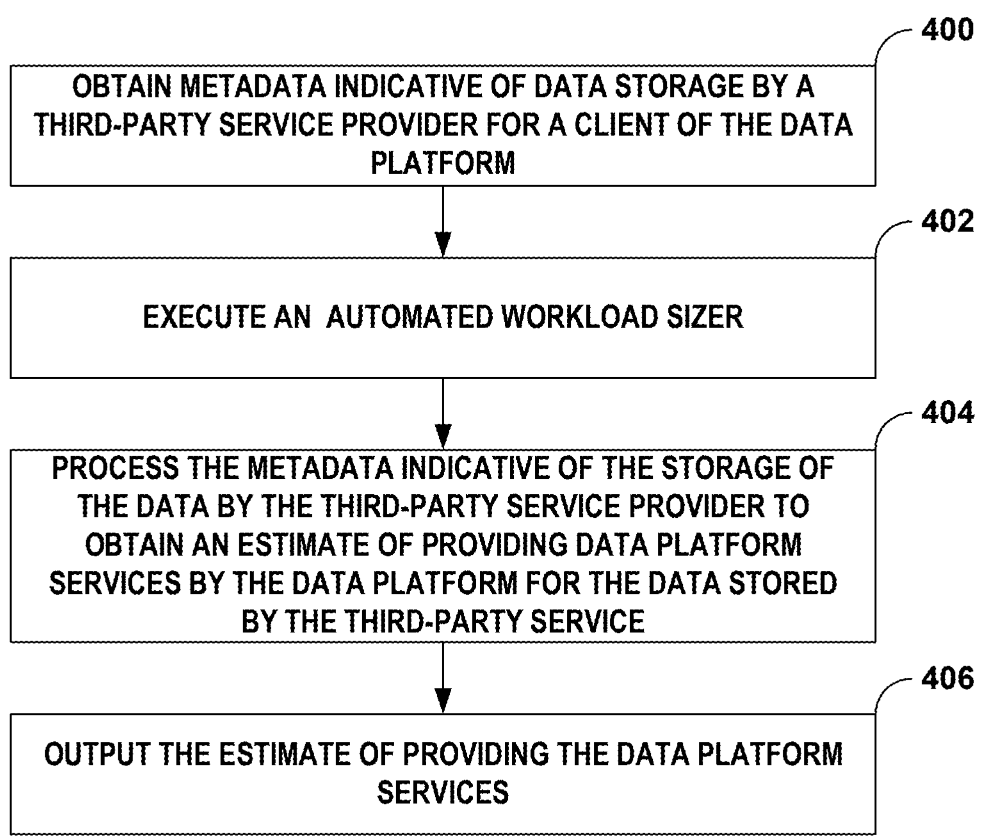
FIG. 4 is a flowchart illustrating example operation of the automated work sizer in accordance with various aspects of the techniques described in this disclosure.

FIG. 4 is a flowchart illustrating example operation of the automated work sizer in accordance with various aspects of the techniques described in this disclosure. As described above with respect to FIG. 1A, data protection manager 154 may execute AWS 163, which may obtain metadata 166 indicative of data stored by a third-party service provider for a (potential or existing) client of data platform 150. AWS 163 may include a script 165 that may be executed locally by data protection manager 154 or remotely by the third-party service (or computing devices of the client), where the dashed-line box shown as "script 165" reflects that the script 165 may be executed locally by data protection manager 154 or remotely by the third-party service and/or client computing devices (including computing device 109 and/or mobile device 108).

Script 165 may include a series of API calls that invoke various functions of API(s) 178 for retrieving metadata 166 from the third-party service provider. Data protection manager 154 may receive or otherwise obtain, from script 165, metadata 166 indicative of data storage by a third-party service provider for a client of data platform 150 (400). Data protection manager 154 may, responsive to obtaining metadata 166, execute AWS 163 (402).

AWS 163 may process metadata 166 indicative of the storage of the data by the third-party service provider to obtain estimate 167 of providing data platform services by data platform 150 for the data stored by the third-party service (404). AWS 163 may output estimate 167 of providing the data platform services (e.g., for purposes of analysis by a sales team) (406).

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

The detailed description set forth herein, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

In accordance with one or more aspects of this disclosure, the term "or" may be interrupted as "and/or" where context does not dictate otherwise. Additionally, while phrases such as "one or more" or "at least one" or the like may have been used in some instances but not others; those instances where such language was not used may be interpreted to have such a meaning implied where context does not dictate otherwise.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

In this way, various aspects of the techniques may enable the following examples.

Example 1. A method comprising: obtaining, by processing circuitry of a computing device, metadata indicative of data storage by a third-party service provider for a client of the data platform; executing, by the processing circuitry, an automated workload sizer, the automated workload sizer configured to perform: processing of the metadata indicative of the storage of the data by the third-party service provider to obtain an estimate of providing data platform services by the data platform for the data stored by the third-party service; and outputting of the estimate for providing the data platform services.

Example 2. The method of example 1, wherein obtaining the metadata comprises executing a script that interfaces with the third-party service provider via an application programming interface exposed by the third-party service provider.

Example 3. The method of any of examples 1 and 2, wherein the metadata indicates one or more of: a number of objects stored for each account supported by the third-party service provider for the client of the data platform; an amount of storage available for each of the accounts supported by the third-party service provider for the client of the data platform; a frequency with which the objects are stored for each of the accounts supported by the third-party service provider for the client of the data platform; a number of sites provided by the third-party service provider that store the data on behalf of the client of the data platform; a location of the sites provided by the third-party service provider; a cost of providing the data storage of the objects by the third-party service provider for the client of the data platform; a number of active accounts; and a number of active workloads per each of the active accounts.

Example 4. The method of example 3, wherein the objects include one or more of files, texts, chat messages, and electronic messages.

Example 5. The method of any of examples 1-4, wherein the automated workload sizer includes a machine learning model configured to extrapolate the metadata to obtain the estimate of providing the data platform services by the data platform for the data stored by the third-party service.

Example 6. The method of example 5, wherein machine learning model comprises: a seasonal autoregressive integrated moving averaging model that generates a first forecast of estimated data storage required by the client for the third-party service; and a long-short term memory model that generates, based on the estimated data storage, a second forecast of estimated data storage required by the client for the third-party service, and wherein the machine learning model is configured to combine the first forecast and the second forecast to generate the estimate.

Example 7. The method of example 5, wherein the machine learning model comprises a long-short term memory model that generates, based on the estimated data storage, the forecast of estimated data storage required by the client for the third-party service.

Example 8. The method of any of examples 1-7, wherein the estimate includes one or more of: a cluster sizing for providing the data platform services that estimates a number of nodes used by the data platform to support the data platform services for the data stored by the third-party service; one or more regions of the data platform services that will be utilized for the data platform; an approximate cost of providing the data platform services; and a schedule for performing the data platform services.

Example 9. The method of any of examples 1-8, wherein the data platform services comprise one or more of backup of the data, archiving of the data, and snapshotting of the data.

Example 10. The method of any of examples 1-9, wherein the automated workload sizer is further configured to determine whether an alert indicating when to move the client between different clusters of the data platform is to be generated.

Example 11. The method of any of examples 1-10, wherein the automated workload sizer is configured to determine whether the alert is to be generated periodically.

Example 12. A computing device comprising: a memory configured to store metadata indicative of data storage by a third-party service provider for a client of the data platform; processing circuitry configured to execute an automated workload sizer, the automated workload sizer configured to: process of the metadata indicative of the storage of the data by the third-party service provider to obtain an estimate of providing data platform services by the data platform for the data stored by the third-party service; and output of the estimate of providing the data platform services.

Example 13. The computing device of example 12, wherein the automated workload sizer is configured to execute a script that interfaces with the third-party service provider via an application programming interface exposed by the third-party service provider.

Example 14. The computing device of any of examples 12 and 13, wherein the metadata indicates one or more of: a number of objects stored for each account supported by the third-party service provider for the client of the data platform; an amount of storage available for each of the accounts supported by the third-party service provider for the client of the data platform; a frequency with which the objects are stored for each of the accounts supported by the third-party service provider for the client of the data platform; a number of sites provided by the third-party service provider that store the data on behalf of the client of the data platform; a location of the sites provided by the third-party service provider; a cost of providing the data storage of the objects by the third-party service provider for the client of the data platform; a number of active accounts; and a number of active workloads per each of the active accounts.

Example 15. The computing device of example 14, wherein the objects include one or more of files, texts, chat messages, and electronic messages.

Example 16. The computing device of any of examples 12-15, wherein the automated workload sizer includes a machine learning model configured to extrapolate the metadata to obtain the estimate of providing the data platform services by the data platform for the data stored by the third-party service.

Example 17. The computing device of example 16, wherein machine learning model comprises: a seasonal autoregressive integrated moving averaging model that generates a first forecast of estimated data storage required by the client for the third-party service; and a long-short term memory model that generates, based on the estimated data storage, a second forecast of estimated data storage required by the client for the third-party service, wherein the machine learning model is configured to combine the first forecast and the second forecast to generate the estimate.

Example 18. The computing device of example 16, wherein the machine learning model comprises a long-short term memory model that generates, based on the estimated data storage, the forecast of estimated data storage required by the client for the third-party service.

Example 19. The computing device of any of examples 12-18, wherein the estimate includes one or more of: a cluster sizing for providing the data platform services that estimates a number of nodes used by the data platform to support the data platform services for the data stored by the third-party service; one or more regions of the data platform services that will be utilized for the data platform; an approximate cost of providing the data platform services; and a schedule for performing the data platform services.

Example 20. A non-transitory computer-readable storage media having instructions stored thereon that, when executed, cause one or more processors to: obtain metadata indicative of data storage by a third-party service provider for a client of the data platform; execute an automated workload sizer, the automated workload sizer configured to: process the metadata indicative of the storage of the data by the third-party service provider to obtain an estimate of providing data platform services by the data platform for the data stored by the third-party service; and output the estimate of providing the data platform services.

Various examples of the disclosure have been described. Any combination of the described systems, operations, or functions is contemplated.

The invention claimed is:

1. A method comprising:

obtaining, by processing circuitry of a computing device that executes a data platform and from a third-party service provider, metadata indicative of data storage by the third-party service provider for a client of the data platform during a first time period;

extrapolating, by an automated workload sizer executed by the processing circuitry, the metadata indicative of the data storage by the third-party service provider to obtain a forecast of the data storage by the third-party service provider for the client over a second time period greater than the first time period, wherein extrapolating the metadata to obtain the forecast comprises:

generating, by a seasonal autoregressive integrated moving averaging model of a machine learning model of the automated workload sizer, a first forecast of estimated data storage required by the client for the third-party service provider; and generating, by a long-short term memory model of the machine learning model of the automated workload sizer, based on the first forecast of estimated data storage, a second forecast of estimated data storage required by the client for the third-party service provider;

combining, by the automated workload sizer, the first forecast and the second forecast to generate an estimate of providing data platform services by the data platform for the data storage by the third-party service provider; and outputting, by the automated workload sizer, the estimate of providing the data platform services.

2. The method of claim 1, wherein obtaining the metadata comprises executing a script that interfaces with the third-party service provider via an application programming interface exposed by the third-party service provider.

3. The method of claim 1, wherein the metadata indicates one or more of:

a number of objects stored for each account supported by the third-party service provider for the client of the data platform;

an amount of storage available for each account supported by the third-party service provider for the client of the data platform;

a frequency with which the objects are stored for each account supported by the third-party service provider for the client of the data platform;

a number of sites provided by the third-party service provider that perform the data storage for the client of the data platform;

a location of the sites provided by the third-party service provider;

a cost of providing the data storage of the objects by the third-party service provider for the client of the data platform;

a number of active accounts; and a number of active workloads per each of the active accounts.

4. The method of claim 3, wherein the metadata indicates one or more of:

the number of objects stored for each account supported by the third-party service provider for the client of the data platform;

the frequency with which the objects are stored for each account supported by the third-party service provider for the client of the data platform; and the cost of providing the data storage of the objects by the third-party service provider for the client of the data platform, and wherein the objects include one or more of files, texts, chat messages, and electronic messages.

5. The method of claim 1, wherein the estimate includes one or more of:

a cluster sizing for providing the data platform services that estimates a number of nodes used by the data platform to support the data platform services for the data storage by the third-party service provider;

one or more regions of the data platform services to be utilized for the data platform;

an approximate cost of providing the data platform services; and a schedule for performing the data platform services.

6. The method of claim 1, wherein the data platform services comprise one or more of backup of the data storage, archiving of the data storage, and snapshotting of the data storage.

7. The method of claim 1, further comprising determining, by the automated workload sizer, whether an alert indicating when to move the client between different clusters of the data platform is to be generated.

8. The method of claim 7, further comprising determining, by the automated workload sizer, whether the alert is to be generated periodically.

9. The method of claim 1, wherein the estimate comprises a prediction of whether providing the data platform services by the data platform for the data storage by the third-party service provider satisfies a Service-level Agreement (SLA) of the client.

10. The method of claim 1, wherein the metadata indicative of the data storage by the third-party service provider for the client comprises a capacity provided by the third-party service, an amount of data stored by the third-party service provider for the client, and an amount of time such data is stored.

11. A computing device comprising:

storage media comprising instructions; and processing circuitry in communication with the storage media, wherein the instructions cause the processing circuitry to:

obtain, from a third-party service provider, metadata indicative of data storage by the third-party service provider for a client of a data platform during a first time period;

execute an automated workload sizer configured to:

extrapolate the metadata indicative of the data storage by the third-party service provider to obtain a forecast of the data storage by the third-party service provider for the client over a second time period greater than the first time period, wherein to extrapolate the metadata to obtain the forecast, the automated workload sizer is configured to:

execute a seasonal autoregressive integrated moving averaging model of a machine learning model configured to generate a first forecast of estimated data storage required by the client for the third-party service provider; and execute a long-short term memory model of the machine learning model configured to generate, based on the first forecast of estimated data storage, a second forecast of estimated data storage required by the client for the third-party service provider; and combine the first forecast and the second forecast to generate an estimate of providing data platform services by the data platform for the data storage by the third-party service provider; and output the estimate of providing the data platform services.

12. The computing device of claim 11, wherein the automated workload sizer is configured to execute a script that interfaces with the third-party service provider via an application programming interface exposed by the third-party service provider.

13. The computing device of claim 11, wherein the metadata indicates one or more of:

a number of objects stored for each account supported by the third-party service provider for the client of the data platform;

an amount of storage available for each account supported by the third-party service provider for the client of the data platform;

a frequency with which the objects are stored for each account supported by the third-party service provider for the client of the data platform;

a number of sites provided by the third-party service provider that perform the data storage for the client of the data platform;

a location of the sites provided by the third-party service provider;

a cost of providing the data storage of the objects by the third-party service provider for the client of the data platform;

a number of active accounts; and a number of active workloads per each of the active accounts.

14. The computing device of claim 13, wherein the metadata indicates one or more of:

the number of objects stored for each account supported by the third-party service provider for the client of the data platform;

the frequency with which the objects are stored for each account supported by the third-party service provider for the client of the data platform; and the cost of providing the data storage of the objects by the third-party service provider for the client of the data platform, and wherein the objects include one or more of files, texts, chat messages, and electronic messages.

15. The computing device of claim 11, wherein the estimate includes one or more of:

a cluster sizing for providing the data platform services that estimates a number of nodes used by the data platform to support the data platform services for the data storage by the third-party service provider;

one or more regions of the data platform services to be utilized for the data platform;

an approximate cost of providing the data platform services; and a schedule for performing the data platform services.

16. Non-transitory, computer-readable storage media having instructions stored thereon that, when executed, cause one or more processors to:

obtain, from a third-party service provider, metadata indicative of data storage by the third-party service provider for a client of a data platform during a first time period;

execute an automated workload sizer configured to:

extrapolate the metadata indicative of the data storage by the third-party service provider to obtain a forecast of the data storage by the third-party service provider for the client over a second time period greater than the first time period, wherein to extrapolate the metadata to obtain the forecast, the automated workload sizer is configured to:

execute a seasonal autoregressive integrated moving averaging model of a machine learning model configured to generate a first forecast of estimated data storage required by the client for the third-party service provider; and execute a long-short term memory model of the machine learning model configured to generate, based on the first forecast of estimated data storage, a second forecast of estimated data storage required by the client for the third-party service provider; and combine the first forecast and the second forecast to generate an estimate of providing data platform services by the data platform for the data storage by the third-party service provider; and output the estimate of providing the data platform services.

* * * * *